United States Patent
Mitchell

(10) Patent No.: US 10,893,684 B2
(45) Date of Patent: Jan. 19, 2021

(54) DIETARY SUPPLEMENT CONTAINING LYOPHILIZED DAIRY AND LINOLENIC ACID

(71) Applicant: Shawn Mitchell, Franklin, WI (US)

(72) Inventor: Shawn Mitchell, Franklin, WI (US)

( * ) Notice: Subject to any disclaimer, the term of this patent is extended or adjusted under 35 U.S.C. 154(b) by 126 days.

(21) Appl. No.: 16/183,770

(22) Filed: Nov. 8, 2018

(65) Prior Publication Data

US 2019/0069570 A1 Mar. 7, 2019

Related U.S. Application Data

(60) Continuation of application No. 15/626,304, filed on Jun. 19, 2017, now abandoned, which is a division of application No. 13/963,016, filed on Aug. 9, 2013, now abandoned.

(60) Provisional application No. 61/681,935, filed on Aug. 10, 2012.

(51) Int. Cl.
*A23C 9/152* (2006.01)
*A23C 9/13* (2006.01)
*A23C 13/12* (2006.01)
*A23C 19/076* (2006.01)

(52) U.S. Cl.
CPC .......... *A23C 9/1528* (2013.01); *A23C 9/1315* (2013.01); *A23C 9/152* (2013.01); *A23C 13/125* (2013.01); *A23C 19/076* (2013.01)

(58) Field of Classification Search
CPC ..... A23C 9/1528; A23C 9/1315; A23C 9/152; A23C 13/125; A23C 9/076
USPC .......................... 426/34, 580, 601, 519, 384
See application file for complete search history.

(56) References Cited

U.S. PATENT DOCUMENTS 7,935,729 B2  5/2011  Harbige et al.

*Primary Examiner* — Helen F Heggestad
(74) *Attorney, Agent, or Firm* — Donald J. Ersler

(57) ABSTRACT

Described is a dietary supplement and a corresponding method to maintain the nutritional health of mammals, including humans. The composition includes a dried dairy product, typically cream, whole milk, reduced fat milk, cottage cheese, yogurt, or combinations thereof in combination with an oil comprising linolenic acid.

4 Claims, No Drawings

DIETARY SUPPLEMENT CONTAINING LYOPHILIZED DAIRY AND LINOLENIC ACID

CROSS-REFERENCES TO RELATED APPLICATIONS

This continuing application takes priority from patent application Ser. No. 15/626,304, filed on Jun. 19, 2017, which takes priority from patent application Ser. No. 13/963,016 filed on Aug. 9, 2013, which claims the benefit of provisional patent application No. 61/681,935 filed on Aug. 10, 2012.

BACKGROUND OF THE INVENTION

Field of the Invention

The present invention relates generally to food supplements and more specifically to a dietary supplement containing lyophilized diary and linolenic acid, which is used to treat problems with inflammation and auto-immune diseases.

SUMMARY OF THE INVENTION (BACKGROUND)

As used herein, "linolenic acid" refers to the two octadecatrienoic acids .alpha.-linolenic acid (an omega-3 fatty acid) and .gamma.-linolenic acid (an omega-6 fatty acid), as well as esters thereof (such as acyl-linolenates, for example triglyceride esters of linolenic acid, and the like). In short, linolenic acids per se are carboxylic acids with 18-carbon chains and three cis double bonds:

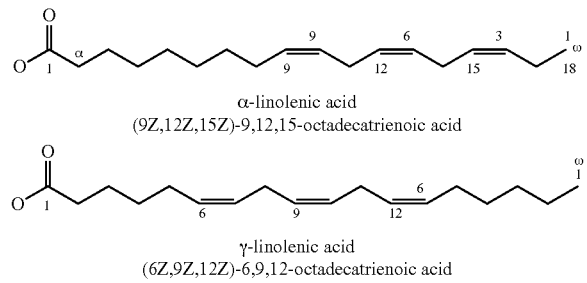

α-linolenic acid
(9Z,12Z,15Z)-9,12,15-octadecatrienoic acid

γ-linolenic acid
(6Z,9Z,12Z)-6,9,12-octadecatrienoic acid

Linolenic acid is a fatty acid found primarily in vegetable oils. It is sold as a dietary supplement for use in humans, principally for treating problems with inflammation and auto-immune diseases. Its efficacy to treat such ailments, however, is disputed.

The patent literature describes at least one medicinal use of linolenic acid. See U.S. Pat. No. 7,935,729, issued May 3, 2011, to Harbige et al. Harbige et al. describe treating neurodegenerative diseases by administering to a patient a triglyceride oil containing both .gamma.-linolenic acid and linolenic acid residues as triglyceride ester. The ratio of .gamma.-linolenic acid to linolenic acid residues at the sn-2 position of the triglyceride is at least 0.8. The amount of .gamma.-linolenic acid residues at the sn-2 position is at least 18%. The oil is administered at a dose sufficient to maintain or elevate TGF-.beta.1 levels in the patient at a therapeutic level.

Accordingly, there is a clearly felt need in the art for a dietary supplement containing lyophilized diary and linolenic acid, which is used to treat problems with inflammation and auto-immune diseases.

DETAILED DESCRIPTION OF THE PREFERRED EMBODIMENTS

Disclosed herein is a dietary supplement comprising a lyophilized dairy component, such as lyophilized cream, whole milk, reduced fat milk, cottage cheese, yogurt, and combinations thereof, which is physically combined into a mixture with an oil comprising linolenic acid, and/or esters of linolenic acid, and/or a non-toxic salt of linoleic acid, and/or a mixture thereof. Preferred versions of the supplement contain .alpha.-linolenic acid and/or its esters and/or salts.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the present invention shall include the corresponding plural characteristic or limitation, and vice-versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods of the present invention can comprise, consist of, or consist essentially of the essential elements and limitations of the products and methods described herein, as well as any additional or optional ingredients, components, or limitations described herein or otherwise useful in formulating dietary supplements.

One step in preparing the dietary supplement is to dry a suitable dairy component for use in the product. As used herein, the term "dry" or "drying" refers to any method now known in the art or developed in the future to convert a liquid product into a corresponding dried product Thus, as used herein, drying the dairy product can be accomplished by, for example (and not limitation) evaporation, freeze-drying (i.e., lyophilization or cryodesiccation), spray drying, and the like.

The dried dairy component is then physically combined with one or more oils comprising linolenic acid and/or its esters. The preferred oils are selected from the group consisting of safflower oil, grape seed oil, poppy seed oil, sunflower oil, hemp oil, corn oil, wheat germ oil, cottonseed oil, soybean oil, walnut oil, sesame oil, rice bran oil, pistachio oil, peanut oil, canola oil, flaxseed oil (linseed oil), olive oil, palm oil, cocoa butter, macadamia oil, butter, coconut oil, and combinations thereof. Thus, the combination is a heterogeneous mixture of the dried dairy component and the liquid (or semi-liquid) oil component.

The resulting combination may optionally be presented in unit dosage form.

In another version of the supplement, the oil too may be dried, so that the combination is in homogeneous powder mixture.

As used herein, the term cottage cheese is used broadly to designate any type of fresh cheese curd, whether curdled with rennet, or added acid, or heat, or a combination of all three. For example, cottage cheese includes traditional, U.S.-style cottage cheese (which is typically curdled with rennet) as well as fresh cheese such as quark (made by warming soured milk until the desired degree of denaturation of milk proteins is met, and then strained), fromage frais, fresh chevre, and the like. The milk product need not come from cows, but from any dairy source, such as goats, sheep, etc.

It is preferred that the dietary supplement be presented in unit dosage form, such as capsules or tablets. Thus, the dietary supplement may be manufactured in unit dosage form and may be prepared by any of the methods well-known in the art of the formulation of foods and pharmaceuticals. All methods include the step of bringing the active compounds into association with one another and optional ingredients, such as carriers, accessory ingredients, and the like. In general, the formulations are prepared by uniformly and intimately bringing the dried dairy and oil components into association with one another and then, if necessary, shaping the product into desired unit dosage form.

The recommended in vivo dosage in humans and other mammals depends largely upon the age and general health of the patient being treated. Determining the optimum dosage for any given mammal is essentially an empirical and ongoing process. The dietary supplement is administered orally. Because of the differences in ages, size and nature of animals, including humans, the amounts which are safe and effective to improve and maintain the health of any given individual may vary considerably. Linolenic acid is a natural food ingredient and it is relatively non-toxic. Thus, the dosages that can be administered in the method disclosed herein are not overly critical as long as they are enough to be effective to maintain the overall nutritional health of the individual being treated, and not so high as to induce a fat intake-related disorder, such as a lipidosis.

Tablets are made by compression or molding, optionally with one or more accessory ingredients. Compressed tablets are prepared by compressing the active compound in a free-flowing form, e.g., a powder or granules, optionally mixed with accessory ingredients, e.g., binders, lubricants, inert diluents, surface active or dispersing agents, using conventional tabletting machinery. Molded tablets may be made by molding a mixture of the combination neat or with a suitable carrier, again using conventional and well-known molding equipment.

In addition to the aforementioned ingredients, the formulations of this invention may further include one or more optional accessory ingredient(s) utilized in the art of dietary formulations, e.g., diluents, buffers, flavoring agents, colorants, binders, surface active agents, thickeners, lubricants, suspending agents, preservatives (including anti-oxidants) and the like.

The dosage may also be carried within an orally tolerated capsule, such as a Caplique-brand capsule.

A suitable effective dose for most conditions ranges from about 1 mg/kg body weight to about 10 g/kg body weight per day, and is preferably in the range of from about 10 to about 1000 mg/kg body weight per day, or about 100 to about 500 mg/kg body weight per day. The total daily dose may be given as a single dose, multiple doses, e.g., two to six times per day, or by intravenous infusion for a selected duration. Dosages above or below the above-cited ranges are within the scope of the invention and such dosages may be administered to individual subject if the circumstances so dictate.

For example, in a 75 kg mammal, a typical daily dosage might fall with the range of from about 100 mg to about 100 g per day. If discrete multiple doses are indicated, treatment might typically comprise 4 equal fractional doses given at 8 hour intervals to supply the total daily dosage.

Also disclosed herein is a method of improving the nutritional status of a mammal, including a human, comprising administering to the mammal a dosage of from about 1 mg/kg body weight to about 10 g/kg body weight per day of a dietary supplement comprising, in combination a dried dairy product, wherein the dairy product is selected from the group consisting of cream, whole milk, reduced fat milk, cottage cheese, yogurt, and combinations thereof; in combination with an oil comprising linolenic acid. In the preferred version of the method, the administered supplement comprises lyophilized cottage cheese, yogurt, or a combination thereof; in combination with flaxseed oil (linseed oil).

In some versions of the product and corresponding method, the formulation may explicitly exclude components found naturally in dairy products, such as lactose. Thus, also disclosed herein is a dietary supplement consisting essentially of or consisting exclusively of, in combination, a dried dairy product, wherein the dairy product is selected from the group consisting of cream, whole milk, reduced fat milk, cottage cheese, yogurt, and combinations thereof, wherein the dried dairy product is devoid of lactose or has a reduced lactose concentration as compared to its natural state; in combination with linolenic acid.

In this context, the phrase "a reduced lactose concentration as compared to its natural state" means that at least about 50%, or at least about 60%, or at least about 70%, or at least about 80%, or at least about 90% of the lactose naturally found in the dried dairy product is removed from the dried dairy product before the dried dairy product is admixed with the linolenic acid. In this fashion, the ultimate composition has a reduced lactose concentration. Thus, for example, disclosed herein is a dietary supplement consisting essentially of or consisting of, in combination: (a) lyophilized cottage cheese, yogurt, or a combination thereof, in which at least 50% of naturally occurring lactose has been removed; in combination with (b) flaxseed oil (linseed oil). Or, for example, a dietary supplement consisting essentially of or consisting of, in combination: (a) a dried dairy product, wherein the dairy product is selected from the group consisting of cream, whole milk, reduced fat milk, cottage cheese, yogurt, and combinations thereof, in which at least 50% of naturally occurring lactose has been removed; in combination with (b) linolenic acid.

It has been found, quite unexpectedly, that the combination of dairy and linolenic acid greatly improves the general nutritional health and metabolism of mammals, including humans. Thus, the composition and method described herein are useful as dietary supplements to improve and maintain the nutritional health of humans and other mammals. The compositions described herein may be formulated in unit dosages suitable for human and/or veterinarian uses.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of creating a dietary supplement comprising the steps of:
   producing cottage cheese through microbial fermentation;
   drying said cottage cheese, such that said cottage cheese has a reduced amount of lactose or is devoid of lactose;

providing flaxseed oil having linolenic acid;
drying the flaxseed oil by lyophilization;
mixing physically said dried cottage cheese with said dried flaxseed oil to form a linolenic mixture; and
providing a plurality of unit dosages of said lyophilized mixture.

2. A method of creating a dietary supplement comprising the steps of:
producing cottage cheese having at least 50% of lactose naturally found therein removed;
lyophilizing said cottage cheese after removal of said at least 50% lactose;
providing flaxseed oil having linolenic acid;
and lyophilizing the linolenic acid, and
mixing physically said dried cottage cheese with said dried flaxseed oil to form a dried linolenic mixture; and
providing a plurality of unit dosages of said lyophilized mixture.

3. A method of creating a dietary supplement the steps consisting of:
producing cottage cheese through acid treatment;
lyophilizing said cottage cheese;
providing flaxseed oil having linolenic acid;
lyophilizing the flaxseed oil;
mixing physically said lyophilized cottage cheese with said lyophilized flaxseed oil to form a dried linolenic mixture; and
providing a plurality of unit dosages of said lyophilized mixture.

4. A method of creating a dietary supplement of claim 3, further including the step of:
producing cottage cheese having at least 50% of lactose naturally found therein removed.

* * * * *